O. C. BREKKEN.
RUNNER FOR AUTOMOBILES.
APPLICATION FILED MAR. 7, 1918.
1,292,427.
Patented Jan. 28, 1919.
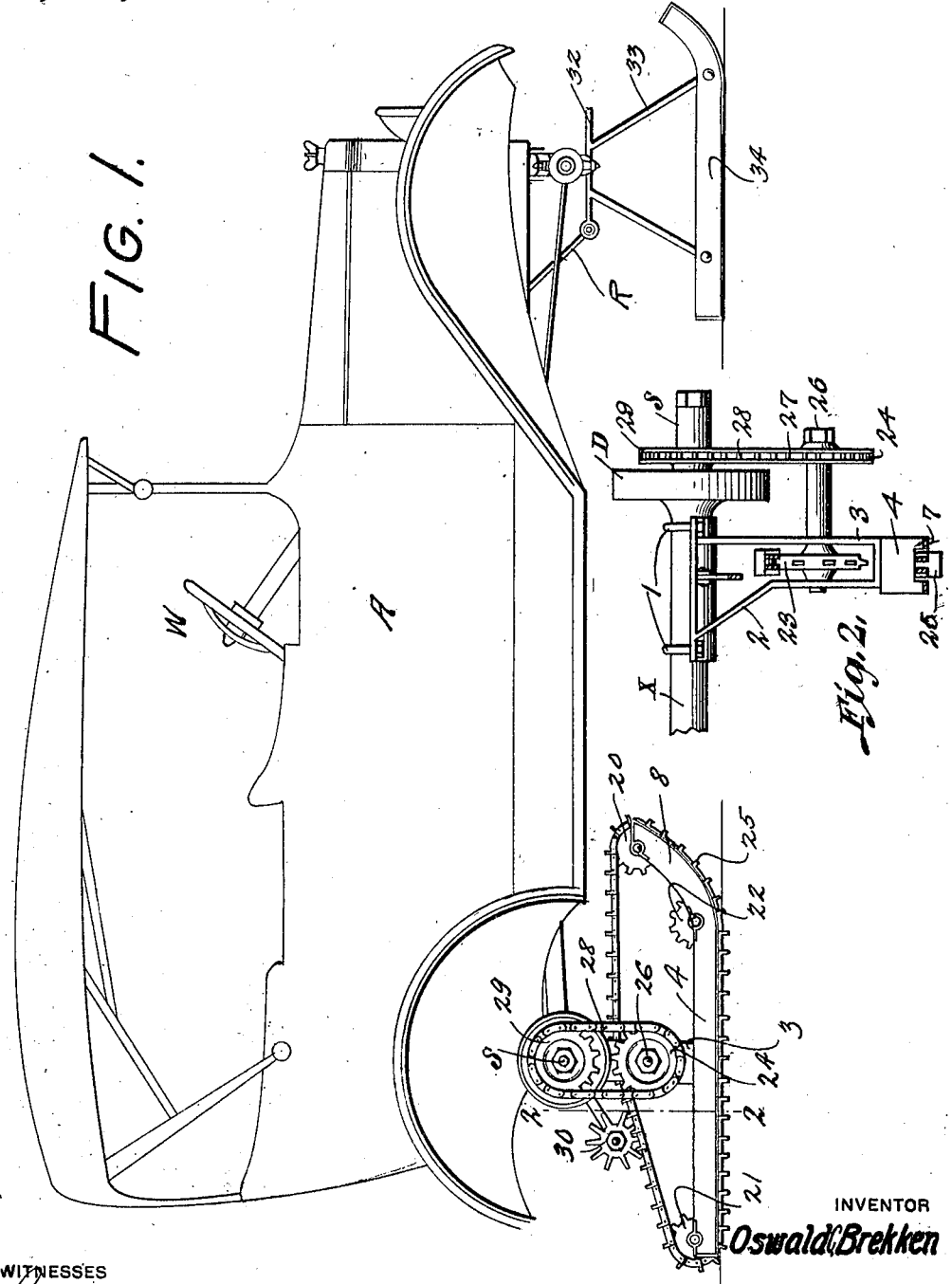
INVENTOR
Oswald C. Brekken
WITNESSES
BY
ATTORNEY

UNITED STATES PATENT OFFICE.

OSWALD C. BREKKEN, OF PEKIN, NORTH DAKOTA.

RUNNER FOR AUTOMOBILES.

1,292,427.   Specification of Letters Patent.   Patented Jan. 28, 1919.

Application filed March 7, 1918. Serial No. 221,027.

*To all whom it may concern:*

Be it known that I, OSWALD C. BREKKEN, a citizen of the United States, residing at Pekin, in the county of Nelson and State of North Dakota, have invented certain new and useful Improvements in Runners for Automobiles, of which the following is a specification.

This invention relates to motor vehicles, and more especially it contemplates the substitution of runners for the wheels thereof, the rear runners having chains moved around their periphery by the driving mechanism so as to increase the traction of the vehicle on the roadway.

Details are set forth in the following specification and shown in the drawings, wherein:—

Figure 1 is a side elevation of an automobile equipped with my invention, and

Fig. 2 is a transverse section on the line 4—4 of Fig. 1.

We are not concerned with the construction of the automobile body A, but the purpose of the invention is to remove the wheels and substitute runners. The front axle has the usual knuckles and spindles and the rear axle X has the usual break drum housing D and driving spindle S. W is the steering wheel and R the steering rod. While I have described and illustrated these elements as parts of an ordinary automobile A, they might be parts of a motor truck or other vehicle. It is my purpose to remove the wheels and supply "narrow gage" runners so that the vehicle can be driven over the icy and snowy roads and streets, and avoid the wheel ruts therein as far as possible. I propose to increase the traction by enlarging the point or grip with tractor chains around the rear runners in a manner to now be explained.

Clipped at 1 to and depending from the rear axle X inside the brake drum housing D is a skeleton framework 2 including spaced uprights 3 which carry a runner 4 upturned or curved at its front end 8 and channeled along its bottom and upturned end as at 7. At the front end of the runner is journaled an idler 20, at its rear end another idler 21, and between its curved portion 8 and its body a third idler 22; while a driving sprocket 23 has its hub continued into a shaft 26 journaled in the framework, and a chain 25 passes around all idlers and over the sprocket. Said shaft 26 extends outward under said housing D as shown in Fig. 4 and carries at its outer end a sprocket 24 which is connected by a chain belt 28 with another sprocket 29 fast on the spindle S of the rear axle, and by this means motion is transmitted from said rear axle to the chain and the latter caused to travel around the runner in a manner which will be clearly understood. If necessary a chain-tightener 30 may be employed as indicated in Fig. 1. While I do not wish to be limited to the construction of the chain, it should be such as will permit it to travel easily within the channel 7 and it should have teeth below the lower face or shoe of the runner for engaging the earth or ice or snow.

Each front runner 34 is carried by a skeleton framework 33 beneath a sector plate 32 constituting part of its support, the sector being pivotally mounted beneath the front axle. The usual steering rod R is detached from the knuckle and connected to the sector plate, and the steering is done by turning the wheel W in the usual manner. Thus the skeleton structure supports each forward runner 34 in direct line with its respective rear runner 4, the forward runner being permitted to turn as the steering mechanism requires, and the rearward runners being driven from the rear axle spindles, which in turn are driven by the engine as usual.

This entire attachment can be applied to an automobile or motor vehicle in a short time and with the use of the ordinary tools and by a person not necessarily an expert. By its employment a wheeled vehicle is converted into one having runners of narrower gage than that of the wheels and therefore it can be used to great advantage over snow and ice and on difficult roadways which could hardly be negotiated by a motor vehicle having the usual rubber tires. I abstain from giving further details, and the proportions and materials of parts are not essential.

What is claimed as new is:—

In an attachment for motor vehicles, the combination of a runner channeled along its wear face, a skeleton structure rising from said runner, means whereby said structure may be mounted beneath and attached to the rear axle inside the brake drum housing thereon, idler wheels in said runner, a sprocket wheel whose hub is journaled in said skeleton structure and extended out beyond the brake drum housing, and a chain passing over the sprocket and idler wheels and along the channel in the runner; of a sprocket on the outer end of said hub, an additional sprocket adapted to be attached to the driving axle-spindle, and a chain connecting the last-named sprockets for the purpose set forth.

In testimony whereof I affix my signature in presence of two witnesses.

OSWALD C. BREKT

Witnesses:
O. S. HOUGE,
L. E. QUAM.